(12) United States Patent
Filippov et al.

(10) Patent No.: US 9,226,018 B1
(45) Date of Patent: Dec. 29, 2015

(54) METHODS AND APPARATUS FOR RENDERING A VIDEO ON A MOBILE DEVICE UTILIZING A LOCAL SERVER

(75) Inventors: Vasily Filippov, Saint-Petersburg (RU); Ildar Karimov, Bashkortostan Region (RU); Denis Byzov, Velikii Novgorod (RU)

(73) Assignee: SPB TV AG, Zug (CH)

( * ) Notice: Subject to any disclaimer, the term of this patent is extended or adjusted under 35 U.S.C. 154(b) by 220 days.

(21) Appl. No.: 13/210,856

(22) Filed: Aug. 16, 2011

(51) Int. Cl.
*H04N 7/10* (2006.01)
*H04N 21/433* (2011.01)
*H04N 21/458* (2011.01)

(52) U.S. Cl.
CPC ......... *H04N 21/4331* (2013.01); *H04N 21/458* (2013.01)

(58) Field of Classification Search
CPC .................. H04N 21/458; H04N 21/4331
USPC ............................ 725/32, 34–36, 44, 49, 62
See application file for complete search history.

(56) References Cited

U.S. PATENT DOCUMENTS

| | | | |
|---|---|---|---|
| 6,317,780 B1 * | 11/2001 | Cohn et al. ............. | 709/217 |
| 6,698,020 B1 * | 2/2004 | Zigmond et al. ........ | 725/34 |
| 6,826,614 B1 * | 11/2004 | Hanmann et al. ....... | 709/227 |
| 7,051,351 B2 * | 5/2006 | Goldman et al. ....... | 725/34 |
| 7,344,251 B2 * | 3/2008 | Marshall ................ | 351/246 |
| 7,519,273 B2 * | 4/2009 | Lowthert et al. ....... | 386/248 |
| 8,000,581 B2 * | 8/2011 | Zalewski ................ | 386/248 |
| 8,107,940 B1 * | 1/2012 | Jackson ................. | 455/418 |
| 8,209,729 B2 * | 6/2012 | Phillips et al. ......... | 725/87 |
| 8,290,351 B2 * | 10/2012 | Plotnick et al. ........ | 386/344 |
| 8,352,980 B2 * | 1/2013 | Howcroft ............... | 725/34 |
| 2001/0042249 A1 * | 11/2001 | Knepper et al. ........ | 725/42 |
| 2002/0087402 A1 * | 7/2002 | Zustak et al. .......... | 705/14 |
| 2002/0129362 A1 * | 9/2002 | Chang et al. .......... | 725/32 |
| 2002/0194593 A1 * | 12/2002 | Tsuchida et al. ....... | 725/32 |
| 2003/0023973 A1 * | 1/2003 | Monson et al. ........ | 725/34 |
| 2003/0212762 A1 * | 11/2003 | Barnes et al. .......... | 709/219 |
| 2004/0103120 A1 * | 5/2004 | Fickle et al. .......... | 707/104.1 |
| 2004/0158858 A1 * | 8/2004 | Paxton et al. ......... | 725/42 |
| 2004/0194131 A1 * | 9/2004 | Ellis et al. ............ | 725/34 |
| 2004/0203630 A1 * | 10/2004 | Wang .................. | 455/414.1 |
| 2005/0177861 A1 * | 8/2005 | Ma et al. .............. | 725/135 |
| 2005/0215238 A1 * | 9/2005 | Macaluso ............. | 455/414.1 |
| 2007/0244750 A1 * | 10/2007 | Grannan et al. ...... | 705/14 |
| 2008/0313033 A1 * | 12/2008 | Guo et al. ............ | 705/14 |
| 2009/0048914 A1 * | 2/2009 | Shenfield et al. ..... | 705/14 |
| 2009/0049090 A1 * | 2/2009 | Shenfield et al. ..... | 707/104.1 |
| 2009/0138906 A1 * | 5/2009 | Eide et al. ........... | 725/32 |
| 2009/0193456 A1 * | 7/2009 | Ahn et al. ............ | 725/32 |
| 2009/0198580 A1 * | 8/2009 | Broberg et al. ....... | 705/14 |
| 2009/0258634 A1 * | 10/2009 | Amine ................. | 455/413 |
| 2010/0125491 A1 * | 5/2010 | Elliott et al. ......... | 705/14.4 |
| 2010/0185501 A1 * | 7/2010 | Chou et al. .......... | 705/14.4 |

(Continued)

*Primary Examiner* — An Son P Huynh
(74) *Attorney, Agent, or Firm* — Chapin IP Law, LLC

(57) ABSTRACT

A system caches a first video on a local server. The local server resides on a mobile device. The first video is downloaded from a first remote server. The system receives a request to render a second video on the mobile device. In response to the request to render the second video, the system renders the first video on the mobile device while beginning to buffer the second video from a second remote server, where the first video is rendered from the local server. The system renders the second video on the mobile device after the first video has completed. The second video is streamed from the second remote server, and the first video and second video are rendered as a single stream.

18 Claims, 13 Drawing Sheets

(56) References Cited

U.S. PATENT DOCUMENTS

| | | |
|---|---|---|
| 2011/0004518 A1* | 1/2011 | Boberg et al. ............ 705/14.52 |
| 2011/0072374 A1* | 3/2011 | Kunz et al. ................ 715/765 |
| 2011/0078728 A1* | 3/2011 | Fu et al. .................... 725/35 |
| 2011/0078740 A1* | 3/2011 | Bolyukh et al. ........... 725/41 |
| 2011/0088061 A1* | 4/2011 | Rowe ......................... 725/35 |
| 2011/0225268 A1* | 9/2011 | Knight et al. .............. 709/219 |
| 2011/0288936 A1* | 11/2011 | Cumming ................. 705/14.58 |
| 2012/0117593 A1* | 5/2012 | Pan ............................ 725/34 |
| 2012/0185334 A1* | 7/2012 | Sarkar et al. .............. 705/14.58 |

* cited by examiner

```
┌─────────────────────────────────────────────────────────────────────────┐
│ 204 CACHE A FIRST VIDEO ON A LOCAL SERVER, THE LOCAL SERVER RESIDING ON │
│ THE MOBILE DEVICE, THE FIRST VIDEO DOWNLOADED FROM A FIRST REMOTE       │
│ SERVER                                                                  │
│                                                                         │
│    ┌───────────────────────────────────────────────────────────────┐    │
│    │ 205 DETECT THAT A MOBILE APPLICATION, RESIDING ON THE MOBILE  │    │
│    │ DEVICE, HAS BEEN LAUNCHED                                     │    │
│    └───────────────────────────────────────────────────────────────┘    │
│                                  │                                      │
│                                  ▼                                      │
│    ┌───────────────────────────────────────────────────────────────┐    │
│    │ 206 IN RESPONSE, DOWNLOAD THE FIRST VIDEO FROM THE FIRST      │    │
│    │ REMOTE SERVER TO THE LOCAL SERVER                             │    │
│    └───────────────────────────────────────────────────────────────┘    │
│                                                                         │
│                                  OR                                     │
│                                                                         │
│   ┌────────────────────────────────────────────────────────────────┐    │
│   │ 207 DOWNLOAD, FROM THE FIRST REMOTE SERVER, AT LEAST ONE       │    │
│   │ DOWNLOAD SCHEDULE ASSOCIATED WITH THE FIRST VIDEO, THE AT LEAST│    │
│   │ ONE DOWNLOAD SCHEDULE SPECIFYING INTERVALS AT WHICH THE FIRST  │    │
│   │ VIDEO IS TO BE DOWNLOADED FROM THE FIRST REMOTE SERVER, THE    │    │
│   │ FIRST VIDEO DOWNLOAD SCHEDULE UTILIZED BY A MOBILE APPLICATION,│    │
│   │ RESIDING ON THE MOBILE DEVICE, TO INVOKE THE DOWNLOADING OF THE│    │
│   │ FIRST VIDEO, FROM THE FIRST REMOTE SERVER, TO THE LOCAL SERVER │    │
│   └────────────────────────────────────────────────────────────────┘    │
└─────────────────────────────────────────────────────────────────────────┘
```

*FIG. 5*

208 CACHE A FIRST VIDEO ON A LOCAL SERVER, THE LOCAL SERVER RESIDING ON THE MOBILE DEVICE, THE FIRST VIDEO DOWNLOADED FROM A FIRST REMOTE SERVER

209 DOWNLOAD, FROM THE FIRST REMOTE SERVER, AT LEAST ONE RULE ASSOCIATED WITH THE FIRST VIDEO ON THE MOBILE DEVICE

210 DETERMINE, FROM THE AT LEAST ONE RULE, THAT A TIME LIMIT ASSOCIATED WITH THE FIRST VIDEO HAS EXPIRED REQUIRING THAT A THIRD VIDEO BE DOWNLOADED FROM THE FIRST REMOTE SERVER TO THE LOCAL SERVER, THE THIRD VIDEO TO BE RENDERED ON THE MOBILE DEVICE, FROM THE LOCAL SERVER, IN PLACE OF THE FIRST VIDEO

OR

211 DETERMINE, FROM THE AT LEAST ONE RULE, THAT THE FIRST VIDEO SHOULD BE DOWNLOADED

212 POLL THE LOCAL SERVER TO VERIFY THE FIRST VIDEO IS CACHED

213 DETECT THAT THE FIRST VIDEO IS NOT CACHED ON THE LOCAL SERVER

214 IN RESPONSE, INSTRUCT THE LOCAL SERVER TO DOWNLOAD THE FIRST VIDEO FROM THE FIRST REMOTE SERVER

215 CONTINUE TO INTERACT WITH A USER, VIA THE MOBILE DEVICE, WHILE THE FIRST VIDEO IS DOWNLOADING FROM THE FIRST REMOTE SERVER TO THE LOCAL SERVER

FIG. 6

216 IN RESPONSE TO THE REQUEST TO RENDER THE SECOND VIDEO, RENDER THE FIRST VIDEO ON THE MOBILE DEVICE WHILE BEGINNING TO BUFFER THE SECOND VIDEO FROM A SECOND REMOTE SERVER, THE FIRST VIDEO RENDERED FROM THE LOCAL SERVER

217 SELECT THE FIRST VIDEO BASED ON PROGRAMMABLE LOGIC LOCATED ON THE LOCAL SERVER, THE PROGRAMMABLE LOGIC CONTROLLED BY INFORMATION TRANSMITTED TO THE LOCAL SERVER BY THE FIRST REMOTE SERVER

OR

218 SELECT THE FIRST VIDEO BASED ON AT LEAST ONE RULE DOWNLOADED FROM THE FIRST REMOTE SERVER

219 RENDER THE FIRST VIDEO FROM THE LOCAL SERVER ON THE MOBILE DEVICE

FIG. 7

220 SELECT THE FIRST VIDEO BASED ON AT LEAST ONE RULE DOWNLOADED FROM THE FIRST REMOTE SERVER

221 EXAMINE THE AT LEAST ONE RULE TO DETERMINE IF THE FIRST VIDEO SHOULD BE RENDERED BASED ON THE REQUEST TO RENDER THE SECOND VIDEO ON THE MOBILE DEVICE

↓

222 SELECT THE FIRST VIDEO BASED ON THE AT LEAST ONE RULE AND BASED THE SECOND VIDEO REQUESTED

OR

223 USE A PRIORITY ALGORITHM TO DETERMINE WHICH OF A PLURALITY OF VIDEOS CACHED ON THE LOCAL SERVER SHOULD BE SELECTED AS THE FIRST VIDEO, THE PRIORITY ALGORITHM USED BY A MOBILE APPLICATION RESIDING ON THE MOBILE DEVICE, THE PRIORITY ALGORITHM USED WITH THE AT LEAST ONE RULE

*FIG. 8*

232 CREATE A LOCAL ADDRESS IDENTIFYING THE FIRST VIDEO CACHED ON THE LOCAL SERVER

233 USE THE LOCAL SERVER TO CREATE THE LOCAL ADDRESS

*FIG. 10*

234 IN RESPONSE TO THE REQUEST TO RENDER THE SECOND VIDEO, RENDER THE FIRST VIDEO ON THE MOBILE DEVICE WHILE BEGINNING TO BUFFER THE SECOND VIDEO FROM A SECOND REMOTE SERVER, THE FIRST VIDEO RENDERED FROM THE LOCAL SERVER

235 WHILE RENDERING THE FIRST VIDEO ON THE MOBILE DEVICE, TRANSMIT A BUFFER REQUEST TO THE LOCAL SERVER TO BUFFER THE SECOND VIDEO, THE BUFFER REQUEST INITIATED BY A MOBILE APPLICATION RESIDING ON THE MOBILE DEVICE

237 INJECT THE FIRST VIDEO INTO A LIVE VIDEO STREAM, THE FIRST VIDEO INJECTED BY THE LOCAL SERVER

238 USEING A VIDEO CONTROLLER, RENDER THE FIRST VIDEO, VIA THE LIVE VIDEO STREAM, ON THE MOBILE DEVICE

239 IN RESPONSE TO THE BUFFER REQUEST, TRANSMIT A DOWNLOAD REQUEST TO THE SECOND REMOTE SERVER TO BEGIN TO DOWNLOAD THE SECOND VIDEO FROM THE SECOND REMOTE SERVER TO THE LOCAL SERVER, THE DOWNLOAD REQUEST INITIATED BY THE LOCAL SERVER

*FIG. 11*

METHODS AND APPARATUS FOR RENDERING A VIDEO ON A MOBILE DEVICE UTILIZING A LOCAL SERVER

CROSS REFERENCE TO RELATED APPLICATIONS

This application relates to the following applications filed on the same date as the present application:
i) "METHODS AND APPARATUS FOR RENDERING VIDEO ADVERTISING ON A MOBILE DEVICE"

BACKGROUND

New technologies allow users, via computerized communication devices (i.e., cellular telephones, Personal Digital Assistants (PDAs), laptops, tablets, iPads®, iPods®, etc.), such as mobile devices, to view television programs (that are currently being aired by television channel providers) as if those viewers were watching those television programs on their television set at home. For example, a user with a mobile device may watch a live sports event, broadcast by a television channel provider, from any location where the mobile device can access communication. Streaming video of the television show is accessed from the television channel providers, and downloaded onto the mobile device. When a user selects a channel to watch (i.e., live TV video or on-demand videos) using their mobile devices, there is a buffering time so as to buffer enough of the signal to start playing the video. This buffering time can be from 1 to 15 seconds, depending on the connection speed. The average time is 5 to 10 seconds. From the user's point of view, the user selects a TV channel to watch, waits a few seconds for the TV show (i.e., the TV video) to begin to play, and then watches the TV channel on their mobile device.

SUMMARY

Conventional computerized technologies for rendering video on a mobile device, such as a mobile phone, suffer from a variety of deficiencies. In particular, conventional technologies for rendering a video are limited in that conventional technologies are slow to load the videos on mobile devices. When users download live TV video or on-demand videos using their mobile devices, they must wait for enough of the video to buffer before the mobile device renders the video. Generally, advertisement videos are shown prior to live streaming TV videos on mobile devices. These advertisement videos are shown via a video controller, each time a user connects to either live video, or on-demand video. A video controller is a native component in mobile operating systems that is responsible for showing streaming video. Usually this component is developed either by an operating system vendor or by a phone vendor, and is provided for third-party software developers as a component they can use in their programs. The video controller downloads, and plays the advertisement video from an advertisement server. Then, the video controller downloads, and plays the live streaming TV video from a live streaming remote server. The video controller cannot perform both of these downloads (i.e., the advertisement video, and the live streaming TV video) simultaneously. Therefore, there are two different buffering steps. First, the user waits for the advertisement to buffer and play. Then, the user waits for the live streaming TV video to buffer while the user stares at a blank screen.

Embodiments disclosed herein significantly overcome such deficiencies and provide a system that includes a computer system and/or software executing a video rendering process that caches a first video (such as an advertisement video) on a local server where the local server resides on the mobile device. The first video, such as an advertisement video, is downloaded from a first remote server, such as an advertisement server. The video rendering process receives a request to render a second video, such as live streaming TV video from a TV channel, on the mobile device. In response, the video rendering process renders the first video (cached on the local server) on the mobile device while beginning to buffer the second video from a second remote server (such as a live streaming TV video server that streams the live TV video from a TV channel). The video rendering process renders the second video on the mobile device after the first video has completed. The second video is streamed from the second remote server, and the first video and second video are rendered as a single stream. Thus, when the user selects a TV channel to watch, the video rendering process immediately plays a cached advertisement video for the user to view, while the video rendering process begins to buffer the live streaming TV video from the live streaming TV server. When the advertisement video has completed, the TV video is buffered, and the video rendering process seamlessly transitions from rendering the cached advertisement video to rendering the live streaming TV video on the mobile device. The user watches both videos without any delay, and without having to stare at a blank screen, waiting for either video to buffer. The cached advertisement videos run faster and decrease the amount of data transferred through the wireless connection when both the advertisement videos and the live streaming TV videos have to be downloaded. This is especially important for slow connections.

In an example embodiment, the video rendering process caches the first video on the local server when a mobile application, residing on the mobile device, has been launched, or after the second video has been rendered on the mobile device (i.e., when the live streaming TV video has finished playing). In another example embodiment, the video rendering process downloads at least one download schedule associated with the first video, from the first remote server (i.e., the advertisement server). The download schedule specifies intervals at which the first video is to be downloaded from the first remote server. The mobile application, residing on the mobile device, utilizes the download schedule to determine when to download the first video, from the first remote server, to the local server. The download schedule determines how often and at what intervals the advertisement videos need to be downloaded from the first remote server (i.e., the advertisement server).

In an example embodiment, the video rendering process downloads, from the remote server, at least one rule associated with the first video. From the rule, the video rendering process determines that the first video should be downloaded from the first remote server (i.e., the advertisement server) to the local server. The video rendering process polls the local server to determine if the first video is cached on the local server. If not, the video rendering process instructs the local server to download the first video from the first remote server to the local server. In an example embodiment, the video rendering process continues to interact with a user, via the mobile device, while downloading the first video from the first remote server to the local server. In another example embodiment, the video rendering process determines that a time limit, associated with the first video, has expired, and that a third video must be downloaded from the first remote server (i.e., the advertisement server) to replace the first video on the local server. In other words, the first video has expired, and a new video is downloaded from the first remote server in place of that expired first video.

In an example embodiment, the video rendering process selects the first video based on programmable logic located on the local server. The programmable logic is controlled by information transmitted to the local server by the first remote server. In another example embodiment, the video rendering process selects the first video based on a rule downloaded from the first remote server. The video rendering process examines the rule to determine if the first video should be rendered based on the request to render the second video on the mobile device, and then selects the first video based on that determination. In other words, the selection of the second video plays a part in whether a first video should be rendered prior to rendering the second video. For example, some TV channels have agreements in place where advertisement videos are not shown prior to viewing the TV programs on that TV channel. In another example embodiment, the video rendering process uses a priority algorithm to determine which of a plurality of videos cached on the local server should be selected as the first video. The priority algorithm is used by a mobile application residing on the mobile device, and is used along with the rule.

In an example embodiment, when the video rendering process renders the first video, the video rendering process creates a local address identifying the first video cached on the local server. The video rendering process also launches a video controller that is capable of rendering the first video and the second video, on the mobile device, and transmits the local address to the video controller. The video rendering process receives a live stream request, using the local address, from the video controller. The video controller requests a live video stream from the local server. The local server injects the first video into the live video stream, and the video controller renders the first video on the mobile device. In an example embodiment, the mobile application, residing on the mobile device, creates the local address, launches the video controller, and transmits the local address to the video controller. In another example embodiment, the local server creates the local address.

In an example embodiment, the video rendering process requests, and the local server provides a local URL specifying the local address of the first video (i.e., the advertisement video) cached on the local server. The video rendering process generates a local URL link to transmit to the second remote server (i.e., the live streaming TV remote server). The local URL link points to the local URL that was provided by the local server to the video rendering process. The second remote server generates a video stream that includes both the local URL link (pointing to the first video stored on the local server) and a link to the second video (i.e., the live streaming TV video) provided by the second remote server. When the video rendering process streams the video stream from the second remote server, the video stream includes the local URL link (pointing to the first video cached on the local server) and the link to the second video (streaming from the second remote server).

In an example embodiment, the video rendering process transmits a buffer request (to buffer the second video from the second remote server) to the local server while rendering the first video on the mobile device. In response, the local server transmits a download request to the second remote server to begin to download the second video from the second remote server to the local server. In another example embodiment, the mobile application transmits the buffer request to the local server. The local server injects the first video into a live video stream, and the video controller renders the first video on the mobile device. When the video rendering process detects that the first video has completed, the local server switches the live video stream coming from the local server to a live video stream coming from the second remote server. The video controller renders the second video, via the live stream, on the mobile device where the video controller renders the first video and the second video as a single live stream.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a mobile device to cause the mobile device to perform the techniques explained as embodiments disclosed herein.

It is to be understood that the system disclosed herein may be embodied strictly as a software program, as software and hardware, or as hardware alone. The embodiments disclosed herein, may be employed in data mobile devices and other mobile devices and software systems for such devices such as those manufactured by MobiWorld Media Inc., of Hackensack, N.J., USA.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 5 illustrates a flowchart of a procedure performed by the system of FIG. 1, when the video rendering process caches a first video on a local server and detects that a mobile application, residing on the mobile device, has been launched, according to one embodiment disclosed herein.

FIG. 6 illustrates a flowchart of a procedure performed by the system of FIG. 1, when the video rendering process caches a first video on a local server, and downloads, from the first remote server, at least one rule associated with the first video, according to one embodiment disclosed herein.

FIG. 7 illustrates a flowchart of a procedure performed by the system of FIG. 1, when the video rendering process renders the first video on the mobile device while beginning to buffer the second video from a second remote server, according to one embodiment disclosed herein.

FIG. 8 illustrates a flowchart of a procedure performed by the system of FIG. 1, when the video rendering process selects the first video based on at least one rule downloaded from the first remote server, according to one embodiment disclosed herein.

FIG. 10 illustrates a flowchart of a procedure performed by the system of FIG. 1, when the video rendering process creates a local address identifying the first video cached on the local server, according to one embodiment disclosed herein.

FIG. 11 illustrates a flowchart of a procedure performed by the system of FIG. 1, when the video rendering process renders the first video on the mobile device while beginning to buffer the second video from a second remote server, and transmits a buffer request to the local server to buffer the second video, according to one embodiment disclosed herein.

DETAILED DESCRIPTION

Embodiments disclosed herein include a computer system executing a video rendering process that caches a first video (such as an advertisement video) on a local server where the local server resides on the mobile device. The first video, such as an advertisement video, is downloaded from a first remote server, such as an advertisement server. The video rendering process receives a request to render a second video, such as live streaming TV video from a TV channel, on the mobile device. In response, the video rendering process renders the first video (cached on the local server) on the mobile device while beginning to buffer the second video from a second remote server (such as a live streaming TV video server that streams the live TV video from a TV channel). The video rendering process renders the second video on the mobile device after the first video has completed. The second video is streamed from the second remote server, and the first video and second video are rendered as a single stream.

Figure 1:
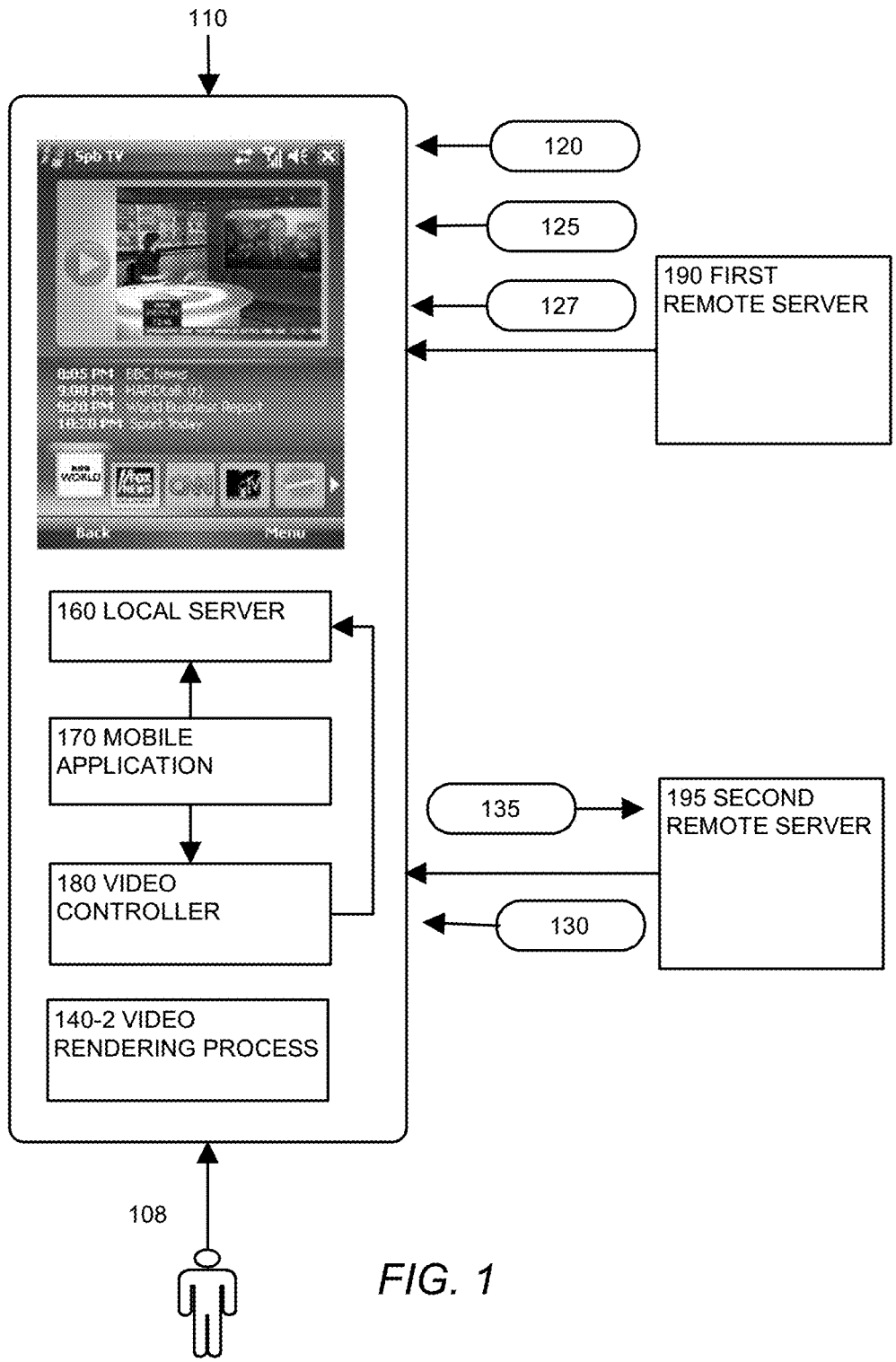
FIG. 1 shows a high-level block diagram of a system according to one embodiment disclosed herein.

FIG. 1 is a block diagram illustrating example architecture of embodiments disclosed herein. A mobile device 110 communicates with a first remote server 190 (such as an advertisement server) to download a first video 120, such as an advertisement video. The mobile device 110 also communicates with a second remote server 195 to download a second video 130, such as live streaming TV video (i.e., the live streaming TV video from a television channel that a user 108 might select to watch on their mobile device 110). The mobile device 110 contains a mobile application 170, residing on the mobile device 110, that communicates with a local server 160 and a video controller 180. The local server 160 requests the first video 120 from the first remote server 190. The first remote server 190 transmits the first video 120 to the local server 160. The first remote server 190 also transmits a download schedule 125 and at least one rule 127 to the mobile device 110. When a user 108 requests a second video 130, the video rendering process 140-2 renders a first video 120 that has been cached in the local server 160 while beginning to buffer the second video 130 from the second remote server 195. While the video controller 180 is rendering the first video 120, the local server 160 transmits a download request 135 to the second remote server 195 to begin to download the second video 130 from the second remote server 195. Once the first video 120 has completed, the second video 130 is buffered, and the video controller 180 renders the second video 130. From the user's 108 perspective, the first video 120 and second video 130 are rendered as a single stream.

Figure 2:
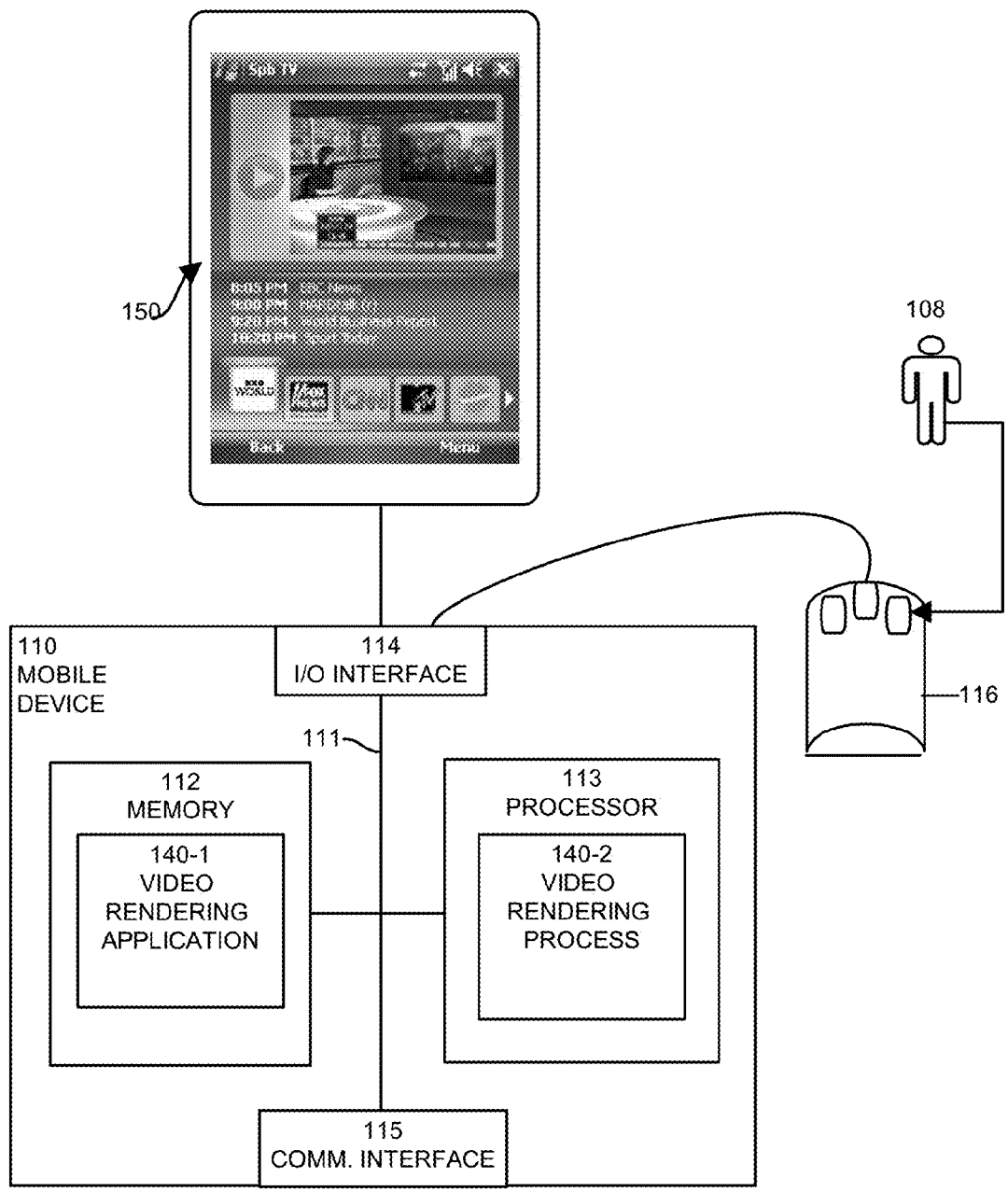
FIG. 2 shows a high-level block diagram of a mobile device according to one embodiment disclosed herein.

FIG. 2 is a block diagram illustrating example architecture of a mobile device 110 that executes, runs, interprets, operates or otherwise performs a video rendering application 140-1 and video rendering process 140-2 suitable for use in explaining example configurations disclosed herein. The mobile device 110 may be any type of computerized device such as a personal computer, workstation, portable computing device, console, laptop, network terminal or the like. An input device 116 (e.g., one or more user/developer controlled devices such as a keyboard, mouse, touch screen, etc.) couples to processor 113 through I/O interface 114, and enables a user 108 to provide input commands, and generally control a graphical user interface that the video rendering application 140-1 and process 140-2 provides on the display 150. As shown in this example, the mobile device 110 includes an interconnection mechanism 111 such as a data bus or other circuitry that couples a memory system 112, a processor 113, an input/output interface 114, and a communications interface 115. The communications interface 115 enables the mobile device 110 to communicate with other devices (i.e., other computers) on a network (not shown).

The memory system 112 is any type of computer readable medium, and in this example, is encoded with a video rendering application 140-1 as explained herein. The video rendering application 140-1 may be embodied as software code such as data and/or logic instructions (e.g., code stored in the memory or on another computer readable medium such as a removable disk) that supports processing functionality according to different embodiments described herein. During operation of the mobile device 110, the processor 113 accesses the memory system 112 via the interconnect 111 in order to launch, run, execute, interpret or otherwise perform the logic instructions of a video rendering application 140-1. Execution of a video rendering application 140-1 in this manner produces processing functionality in video rendering process 140-2. In other words, the video rendering process 140-2 represents one or more portions or runtime instances of a video rendering application 140-1 (or the entire a video rendering application 140-1) performing or executing within or upon the processor 113 in the mobile device 110 at runtime.

It is noted that example configurations disclosed herein include the video rendering application 140-1 itself (i.e., in the form of un-executed or non-performing logic instructions and/or data). The video rendering application 140-1 may be stored on a computer readable medium (such as a floppy disk), hard disk, electronic, magnetic, optical, or other computer readable medium. A video rendering application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of a video rendering application 140-1 in the processor 113 as the video rendering process 140-2. Those skilled in the art will understand that the mobile device 110 may include other processes and/or software and hardware components, such as an operating system not shown in this example.

A display 150 need not be coupled directly to mobile device 110. For example, the video rendering application 140-1 can be executed on a remotely accessible mobile device 110 via the network interface 115. In this instance, the display 150 may be displayed locally to a user 108 of the remote computer, and execution of the processing herein may be client-server based.

Figure 3:
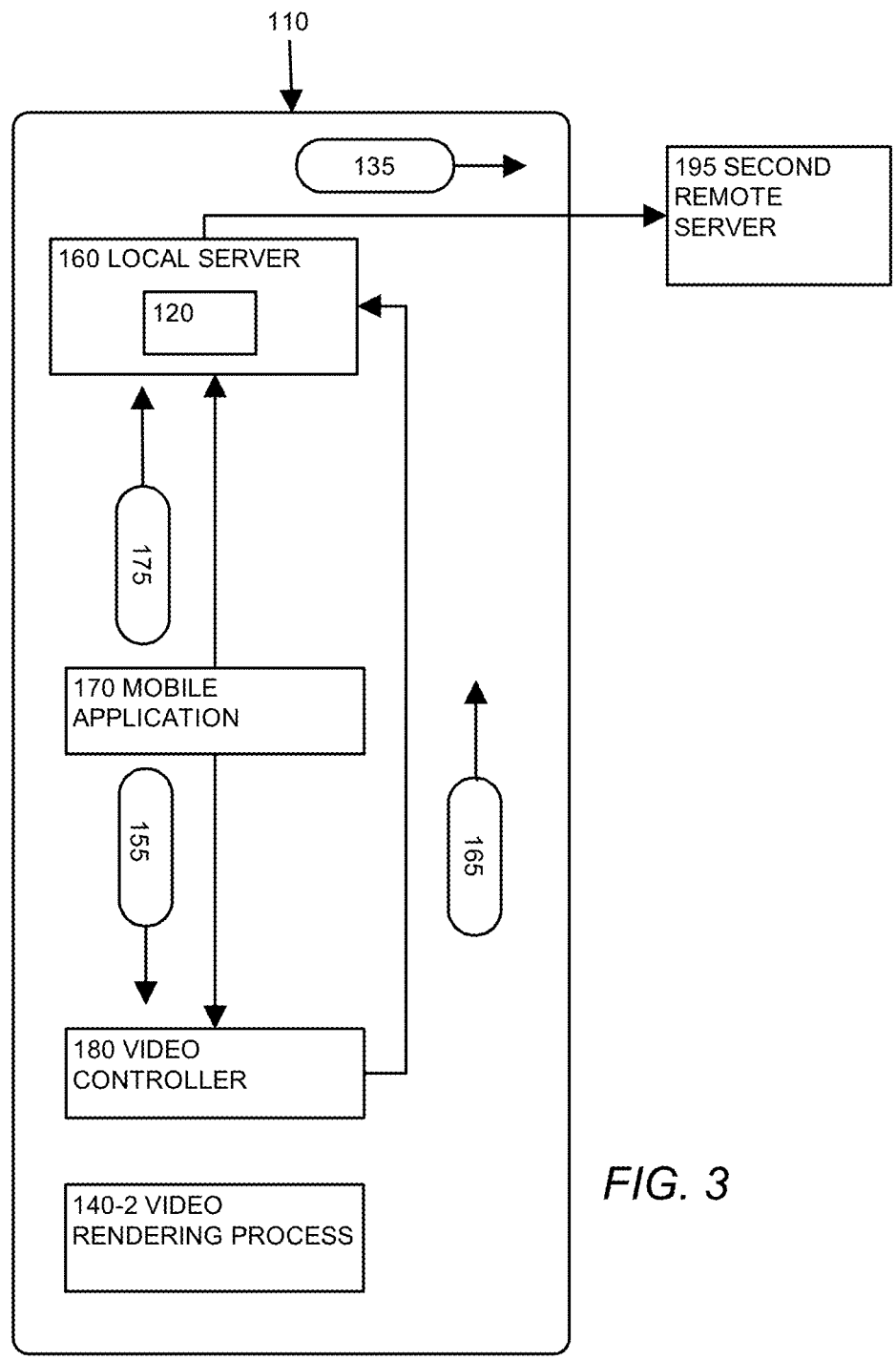
FIG. 3 shows a high-level block diagram of handshaking between components residing within the mobile device depicted in FIG. 1, according to one embodiment disclosed herein.

FIG. 3 is a block diagram illustrating example architecture of handshaking between components residing within the mobile device 110. The mobile device 110 contains a local server 160, mobile application 170 and video controller 180. The local server 160 communicates with both the first remote server 190 (not shown) and the second remote server 195. The first video 120 is cached on the local server 160. When the video rendering process 140-2 renders the first video 120, the video rendering process 140-2 creates a local address 155 that identifies the first video 120 cached on the local server 160. In an example embodiment, it is the mobile application 170 that creates the local address 155. In another example embodiment, the local server 160 creates the local address 155. The mobile application 170, residing on the mobile device 110, launches the video controller 180 where the video controller 180 is capable of rendering both the first video 120 and the second video 130. The video rendering process 140-2 transmits the local address 155 to the video controller 180. The video controller 180 transmits a live stream request 165, using the local address 155 to the local server 160. The local server 160 injects the first video 120 into the live video stream, and the video controller 180 renders the first video 120 on the mobile device 110 via the live video stream. While the local server 160 is rendering the first video 120, the mobile application 170 transmits a buffer request 175 to the local server 160 to buffer the second video 130. In response to the buffer request 175, the local server 160 transmits a download request 135 to the second remote server 195.

Further details of configurations explained herein will now be provided with respect to a flow chart of processing steps that show the high level operations disclosed herein to perform the video rendering process 140-2.

Figure 4:
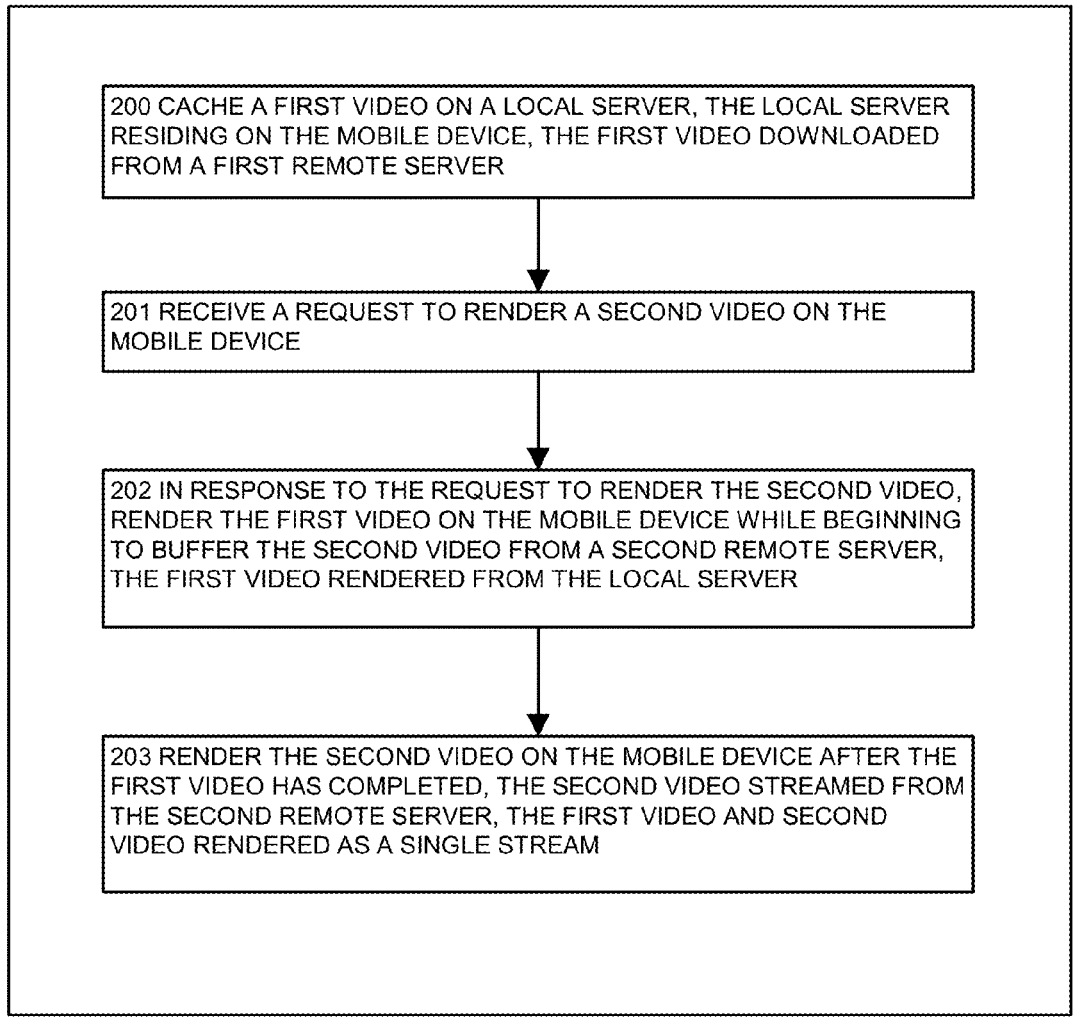
FIG. 4 illustrates a flowchart of a procedure performed by the system of FIG. 1, when the video rendering process caches a first video on a local server, the local server residing on the mobile device, according to one embodiment disclosed herein.

FIG. 4 is an embodiment of the steps performed by video rendering process 140-2 when it caches a first video 120 on a local server 160, where the local server 160 resides on the mobile device 110, and the first video 120 is downloaded from a first remote server 190.

In step 200, the video rendering process 140-2 caches a first video 120 on a local server 160, where the local server 160 resides on the mobile device 110. The first video 120 is downloaded from a first remote server 190. The video rendering process 140-2 caches the first video 120, such as an advertisement video, on the local server 160. The first video 120 is downloaded from a first remote server 190, such as an advertisement server. A mobile application 170, residing on the mobile device 110, sends a request to the first remote server 190 (i.e., the advertisement server), and in return, receives list of available advertising assets, including advertisement images and advertisement videos (i.e., first videos 120), from the first remote server 190. The video rendering process 140-2 caches the first video 120 (i.e., the advertisement video) on the local server 160 for future rendering.

In step 201, the video rendering process 140-2 receives a request to render a second video 130 on the mobile device 110. In an example embodiment, a user 108, operating the mobile device 110, selects a television channel to watch live programming (i.e., the second video 130) from that television channel. In another example embodiment, the mobile application 170 receives the request to render a second video 130 on the mobile device 110 from the user 108.

In step 202, the video rendering process 140-2, in response to the request to render the second video 130, renders the first video 120 on the mobile device 110 while beginning to buffer the second video 130 from a second remote server 195. In an example embodiment, when a user 108 selects a television channel to view, the video rendering process 140-2 renders a first video 120 (i.e., an advertisement video), while beginning to buffer the second video 130 (i.e., the live streaming TV video) from the second remote server 195 (i.e., a live streaming TV server). The first video 120 is rendered from the local server 160. In other words, the first video 120 begins playing immediately, and the user 108 does not stare at a blank screen waiting for the first video 120 to buffer.

In step 203, the video rendering process 140-2 renders the second video 130 on the mobile device 110 after the first video 120 has completed. In an example embodiment, when the first video 120 (i.e., the advertisement video) has completed, the video rendering process 140-2 streams the second video 130 (i.e., the live streaming TV video) from the second remote server 195 (i.e., a live streaming TV server). The first video 120 and second video 130 are rendered as a single stream. In other words, when the user 108 selects a television channel to view on the mobile device 110, the video rendering process 140-2 first renders the first video 120 residing on the local server 160. While the user 108 views the first video 120, the local server 160 transmits a request to a second remote server 195 to begin buffering the second video 130. When the locally hosted first video 120 finishes playing, the local server 160 starts re-transmitting the (now buffered) live second video 130 from the second remote server 195. This happens seamlessly as the video rendering process 140-2 renders the same stream that now (after the first video 120 has completed) contains a live streaming TV video (i.e., the second video 130 streaming from the second remote server 195).

FIG. 5 is an embodiment of the steps performed by video rendering process 140-2 when it caches a first video 120 on a local server 160, where the local server 160 resides on the mobile device 110, and the first video 120 is downloaded from a first remote server 190.

In step 204, the video rendering process 140-2 caches a first video 120 on a local server 160, where the local server 160 resides on the mobile device 110. The local server 160 communicates with the video controller 180, the first remote server 190 (i.e., the advertisement server), and the second remote server 195 (i.e., the live streaming TV server). The first video 120 is downloaded from a first remote server 190. The video rendering process 140-2 caches the first video 120, such as an advertisement video, on the local server 160. The first video 120 is downloaded from a first remote server 190, such as an advertisement server. A mobile application 170, residing on the mobile device 110, sends a request to the first remote server 190 (i.e., the advertisement server), and in return, receives list of available advertising assets, including advertisement images and advertisement videos, from the first remote server 190. The video rendering process 140-2 caches the first video 120 (i.e., the advertisement video) on the local server 160 for future rendering.

In step 205, the video rendering process 140-2 detects that a mobile application 170, residing on the mobile device 110, has been launched. For example, a user 108 may turn on the mobile device 110, and in response, the mobile application 170 is launched.

In response, in step 206, the video rendering process 140-2 downloads the first video 120 from the first remote server 190 to the local server 160. In an example embodiment, the launching of the mobile application 170 (for example, when a user 108 turns on the mobile device 110) invokes the process of caching a first video 120 (i.e., an advertisement video) from a first remote server 190 (i.e., an advertisement server) to the local server 160.

Alternatively, in step 207, the video rendering process 140-2 downloads, from the first remote server 190, at least one download schedule 125 associated with the first video 120. The download schedule 125 specifies intervals at which the video rendering process 140-2 downloads the first video 120 from the first remote server 190 to the local server 160. The download schedule 125 is utilized by a mobile application 170, residing on the mobile device 110, to invoke the downloading of the first video 120, from the first remote server 190, to the local server 160. In other words, when the video rendering process 140-2 connects to the local server 160, the video rendering process 140-2 receives the download schedule 125, from the first remote server 190, along with the first video 120. The download schedule 125 dictates how often the video rendering process 140-2 should download first videos 120 from the first remote server 190.

FIG. 6 is an embodiment of the steps performed by video rendering process 140-2 when it caches a first video 120 on a local server 160, where the local server 160 resides on the mobile device 110, and the first video 120 is downloaded from a first remote server 190.

In step 208, the video rendering process 140-2 the video rendering process 140-2 caches a first video 120 on a local server 160, where the local server 160 resides on the mobile device 110, and the first video 120 is downloaded from a first remote server 190 (i.e., the advertisement server). The video rendering process 140-2 caches the first video 120, such as an advertisement video, on the local server 160. The first video 120 is downloaded from a first remote server 190, such as an advertisement server. A mobile application 170, residing on the mobile device 110, sends a request to the first remote server 190, and in return, receives list of available advertising assets, including advertisement images and advertisement videos, from the first remote server 190. The video rendering process 140-2 caches the first video 120 (i.e., the advertisement video) on the local server 160 for future rendering.

In step 209, the video rendering process 140-2 downloads, from the first remote server 190, at least one rule 127 associated with the first video 120 on the mobile device 110. In an example embodiment, the local server 160 downloads and caches the first video 120, along with the rule 127 (i.e., an advertisement displaying rule), from the first remote server 190. The local server 160 manages the first video 120 based on the rule 127, or multiple rules 127 that are downloaded from the first remote server 190, along with the first video 120. In another example embodiment, the rules 127 are downloaded via an XML file. In other words, the rules 127 specify how and when the first videos 120 (i.e., advertisement videos) are to be rendered prior to rendering the second videos 130 (i.e., live streaming TV video) on the mobile device 110.

In step 210, the video rendering process 140-2 determines, from at least one rule 127, that a time limit associated with the first video 120 has expired requiring that a third video be downloaded from the first remote server 190 to the local server 160. The third video is to be rendered on the mobile device 110, from the local server 160, in place of the first video 120. In an example embodiment, the rule 127 may also include information on expiration dates associated with each first video 120 downloaded from the first remote server 190 to the local server 160. When a first video 120 has expired, the video rendering process 140-2 downloads a third video from the first remote server 190 to replace the expired first video 120. The third video is rendered on the mobile device 110 in place of the first video 120. In other words, the video rendering process 140-2 replaces expired first videos 120 with new videos that have not yet expired. The rule 127 downloaded from the first remote server 190 to the local server 160 provides the video rendering process 140-2 with information regarding when any of the advertisement videos (i.e., first videos 120) have expired.

Alternatively, in step 211, the video rendering process 140-2 determines, from the rule 127, that the first video 120 should be downloaded. In an example embodiment, when the mobile application 170 is launched, the mobile application 170 sends a request to an Authorization server. In return, the mobile application 170 receives TV channel descriptions and configuration file(s) from the Authorization Server, including the links to live streams. The mobile application 170 then sends a request to the first remote server 190, and receives a list of available advertising assets, such as advertisement images and first videos 120 (i.e., advertisement videos) from the first remote server 190. From this information, the video rendering process 140-2 determines that the first video 120 should be downloaded from the first remote server 190.

In step 212, the video rendering process 140-2 polls the local server 160 to verify the first video 120 is cached. In an example embodiment, the mobile application 170 polls the local server 160 for information about the first video 120, for example, if the first video 120 is cached. The mobile application 170 determines which first videos 120 should be cached on the local server 160 based on advertisement information received from an Authorization Server. In an example embodiment, the mobile application 170 polls the local server 160 for each of the first videos 120 (i.e., advertisement videos) that should be cached on the local server 160.

In step 213, the video rendering process 140-2 detects that the first video 120 is not cached on the local server 160. In an example embodiment, the mobile application 170 receives advertisement information from an Authorization Server. The advertisement information includes information regarding which first video 120 should be played prior to rendering a second video 130. Based on the information received from the Authorization Server, the mobile application 170 polls the local server 160 to determine if the first video 120 (specified by the information received from the Authorization Server) is cached in the local server 160. In an example embodiment, after polling the local server 160, the video rendering process 140-2 determines that a first video 120, specified by information received from the Authorization Server, is not cached in the local server 160.

In response, in step 214, the video rendering process 140-2 instructs the local server 160 to download the first video 120 from the first remote server 190. In an example embodiment, if the video rendering process 140-2 determines that a first video 120 should be cached, and that first video 120 is not discovered when the video rendering process 140-2 polls the local server 160, the video rendering process 140-2 instructs the local server 160 to download the first video 120 from the first remote server 190.

In step 215, the video rendering process 140-2 continues to interact with a user 108, via the mobile device 110, while the first video 120 is downloading from the first remote server 190 to the local server 160. In an example embodiment, the user 108 may continue to interact with the mobile device 110 while the video rendering process 140-2 downloads the first video 120 from the first remote server 190 to the local server 160.

FIG. 7 is an embodiment of the steps performed by video rendering process 140-2 when it renders the first video 120 on the mobile device 110 while beginning to buffer the second video 130 from a second remote server 195.

In step 216, the video rendering process 140-2, in response to the request to render the second video 130, renders the first video 120 on the mobile device 110 while beginning to buffer the second video 130 from a second remote server 195. The first video 120 is rendered from the local server 160. In an example embodiment, a user 108 selects a TV channel to watch on the mobile device 110. The video rendering process 140-2, in response to the request to watch the TV channel, renders the first video 120 (i.e., an advertisement video) on the mobile device 110, while, at the same time, beginning to buffer the second video 130 from a second remote server 195. The first video 120 is rendered from the local server 160 (where the first video 120 was previously cached). In other words, the user 108 selects a TV channel to view, and watches an advertisement video (i.e., the first video 120) on the mobile device 110 prior to viewing the TV channel (i.e., the second video 130, streamed live from the second remote server 195). The rendering of the first video 120 occurs immediately when the user 108 selects the TV channel, such that the user 108 does not have to wait for any video to buffer before playing.

In step 217, the video rendering process 140-2 selects the first video 120 based on programmable logic located on the local server 160. The programmable logic, residing on the local server 160, is controlled by information transmitted to the local server 160 by the first remote server 190 (i.e., the advertisement server).

Alternatively, in step 218, the video rendering process 140-2 selects the first video 120 based on at least one rule 127 downloaded from the first remote server 190. In an example embodiment, the video rendering process 140-2 downloads the first video 120 (i.e., an advertisement video) from a first remote server 190 (i.e., an advertisement server), and caches the first video 120 on the local server 160. The video rendering process 140-2 also downloads, from the first remote server 190, at least one rule associated with the first video 120. The rule(s) 127 include, for example, advertisement displaying rules associated with the first video 120. In other words, the local server 160 manages the first videos 120 based on the rules 127 that are downloaded from the first remote server 190, along with the first videos 120. In an example embodiment, the rules 127 are downloaded via an XML file.

In step 219, the video rendering process 140-2 renders the first video 120 from the local server 160 on the mobile device 110. In an example embodiment, when a user 108 selects a TV channel to view, the video rendering process 140-2 renders the first video 120 (i.e., an advertisement video) from the local server 160 on the mobile device 110. The local server 160 transmits the first video 120, and the video controller 180 plays the first video 120 on the mobile device 110. In other words, the user 108 selects a TV channel to view, and then watches an advertisement video (i.e., a first video 120) that begins to play immediately because the advertisement video is cached on the local server 160.

FIG. 8 is an embodiment of the steps performed by video rendering process 140-2 when it selects the first video 120 based on at least one rule 127 downloaded from the first remote server 190.

In step 220, the video rendering process 140-2 selects the first video 120 based on at least one rule 127 downloaded from the first remote server 190. In an example embodiment, there are rules 127 (provided by the first remote server 190) that dictate which first video 120 to render, and when to render the first video 120 depending on factors such as when a previous first video 120 was shown, and which current TV channel is being accessed.

In step 221, the video rendering process 140-2 examines the rule 127 to determine if the first video 120 should be rendered based on the request to render the second video 130 on the mobile device 110. In an example embodiment, there may be rules 127 that indicate a first video 120 should not be rendered prior to playing a particular TV channel. This rule 127 might be based on the commercial agreements with these TV channels. Prior to rendering the first video 120, the video rendering process 140-2 examines the rule 127 to determine if the first video 120 should be rendered prior to the rendering of the second video 130.

In step 222, the video rendering process 140-2 selects the first video 120 based on the rule 127, and based the second video 130 requested. In an example embodiment, the video rendering process 140-2 examines the rule 127 to determine if a first video 120 should be rendered prior to rendering the second video 130, and if so, selects the first video 120 based on both the rule 127 and the second video 130 requested.

Alternatively, in step 223, the video rendering process 140-2 uses a priority algorithm to determine which of a plurality of advertisement videos cached on the local server 160 should be selected as the first video 120. The priority algorithm is used by a mobile application 170 residing on the mobile device 110. The priority algorithm is used with at least one rule 127. In an example embodiment, the video rendering process 140-2 caches a plurality of first videos 120 (i.e., advertisement videos), downloaded from the first remote server 190 (i.e., the advertisement server) on the local server 160. When a user 108 selects a TV channel to watch (i.e., selects a second video 130), the video rendering process 140-2 uses a priority algorithm to determine which of the cached first videos 120 should be selected, and rendered on the mobile device 110 prior to rendering the TV program (i.e., the second video 130) streaming live on the second remote server 195 (i.e., the live streaming TV server).

Figure 9:
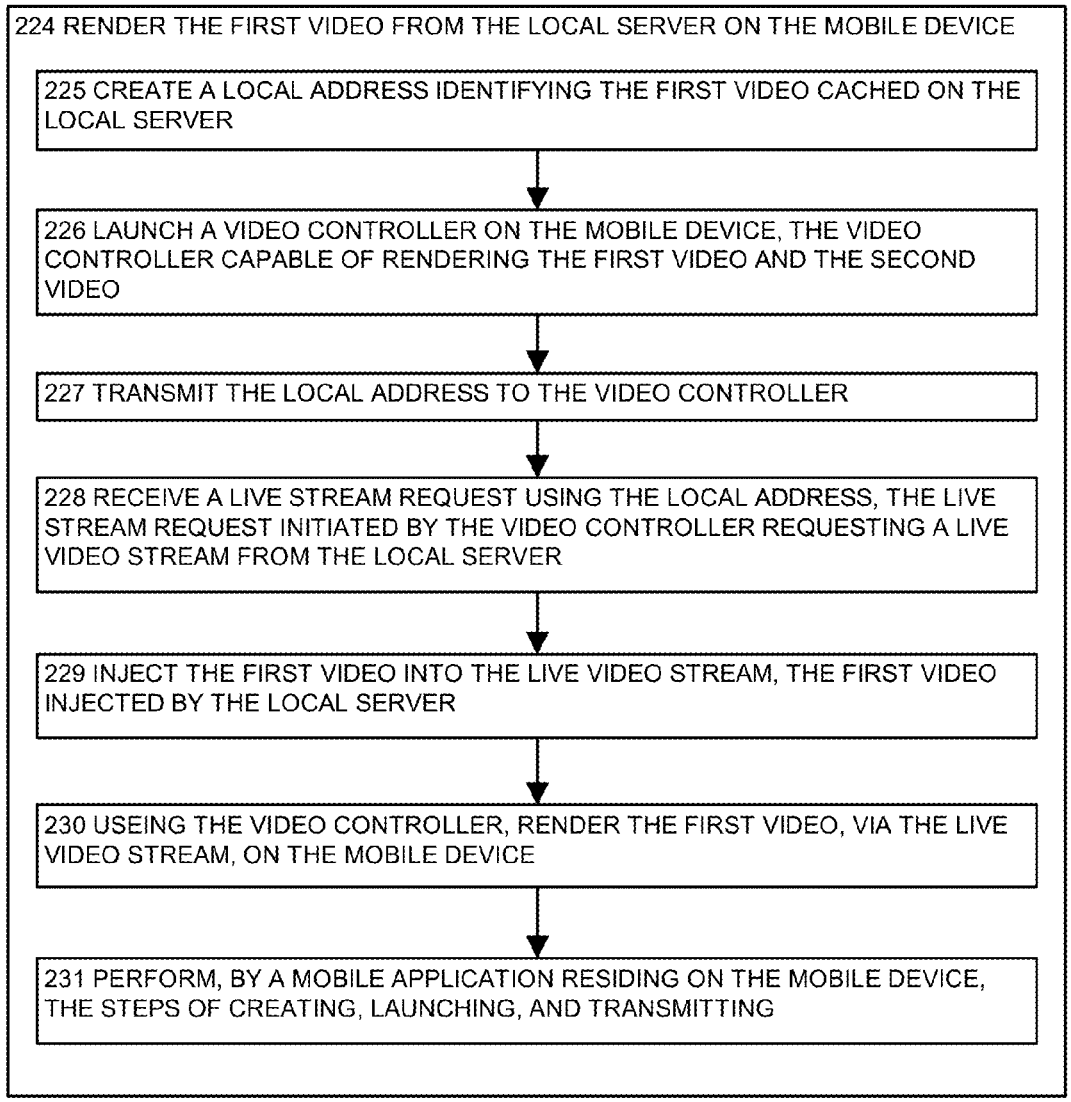
FIG. 9 illustrates a flowchart of a procedure performed by the system of FIG. 1, when the video rendering process renders the first video from the local server on the mobile device, according to one embodiment disclosed herein.

FIG. 9 is an embodiment of the steps performed by video rendering process 140-2 when it renders the first video 120 from the local server 160 on the mobile device 110.

In step 224, the video rendering process 140-2 renders the first video 120 from the local server 160 on the mobile device 110. In an example embodiment, a user 108 selects a TV channel to view on their mobile device 110. Prior to rendering the TV channel (i.e., the second video 130), streamed from the second remote server 195 (i.e., the live streaming remote server), the video rendering process 140-2 renders a first video 120 (i.e., an advertisement video), from the local server 160, residing on the mobile device 110. The first video 120 was previously downloaded from a first remote server 190 (i.e., an advertisement server), and cached on the local server 160.

In step 225, the video rendering process 140-2 creates a local address 155 identifying the first video 120 cached on the local server 160. In an example embodiment, the video rendering process 140-2 creates a local URL with information regarding which first video 120 should be selected to inject into a live stream.

In step 226, the video rendering process 140-2 launches a video controller 180 on the mobile device 110 where the video controller 180 capable of rendering both the first video 120 and the second video 130. The video controller 180 is a native component in mobile operating systems that is responsible for rendering both a first video 120 (i.e., advertisement video) and a second video 130 (i.e., live streaming TV video), and even on-demand video that may also be cached on the local server 160.

In step 227, the video rendering process 140-2 transmits the local address 155 to the video controller 180. In an example embodiment, the video rendering process 140-2 transmits the local address 155, such as a local URL, to the video controller 180. In another example embodiment, the mobile application 170 transmits the local address 155 to the video controller 180.

In step 228, the video rendering process 140-2 receives a live stream request 165 using the local address 155. The live stream request is initiated by the video controller 180 that requests a live video stream from the local server 160. In an example embodiment, the video controller 180 begins to request the live stream request 165 from the local server 160 using a local address 155 that the mobile application 170 passed to the video controller 180.

In step 229, the video rendering process 140-2 injects the first video 120 into the live video stream where the first video 120 is injected by the local server 160. In an example embodiment, while buffering the second video 130 from the second remote server 195, the local server 160 injects the cached first video 120 into the live video stream.

In step 230, the video rendering process 140-2, using the video controller 180, renders the first video 120, via the live video stream, on the mobile device 110. In an example embodiment, the video controller 180 requests the first video 120 from the local server 160 using a local address 155 passed to the video controller 180 by the mobile application 170. The local server 160 injects the first video 120 into the live video stream, and the video controller 180 plays the live video stream.

In step 231, the video rendering process 140-2 performs, the steps of creating, launching, and transmitting. In an example embodiment, the mobile application 170, residing on the mobile device 110, performs the steps of creating the local address 155, launching the video controller 180, and transmitting the local address 155 to the video controller 180. In other words, the mobile application 170 instructs the local server 160 which components to use when composing the live video stream.

FIG. 10 is an embodiment of the steps performed by video rendering process 140-2 when it creates a local address 155 identifying the first video 120 cached on the local server 160.

In step 232, the video rendering process 140-2 creates a local address 155 identifying the first video 120 cached on the local server 160. The video rendering process 140-2 creates the local address 155 that the video rendering process 140-2 transmits to the video controller 180. The video controller 180 uses the local address 155 to request a live video stream from the local server 160. Then, the video controller 180 renders the first video 120 cached on the local server 160.

In step 233, the video rendering process 140-2 uses the local server 160 to create the local address 155. In an example embodiment, the local server 160 creates the local address 155 by deciding which components to use when composing the live video stream. In another example embodiment, the mobile application 170, residing on the mobile device 110, creates the local address 155.

FIG. 11 is an embodiment of the steps performed by video rendering process 140-2 when it renders the first video 120 on the mobile device 110 while beginning to buffer the second video 130 from a second remote server 195.

In step 234, the video rendering process 140-2, in response to the request to render the second video 130, renders the first video 120 on the mobile device 110 while beginning to buffer the second video 130 from a second remote server 195. The first video 120 is rendered from the local server 160. In an example embodiment, when a user 108 selects a television channel to view, the video rendering process 140-2 renders a first video 120 (i.e., an advertisement video), while beginning to buffer the second video 130 (i.e., the live streaming TV video) from the second remote server 195 (i.e., a live streaming TV server). The first video 120 is rendered from the local server 160. In other words, the first video 120 begins playing immediately, and the user 108 does not have to wait for the first video 120 to buffer.

In step 235, the video rendering process 140-2, while rendering the first video 120 on the mobile device 110, transmits a buffer request 175 to the local server 160 to buffer the second video 130. The buffer request is initiated by a mobile application 170 residing on the mobile device 110. In an example embodiment, while the video controller 180 begins to request the live video stream from the local server 160, the mobile application 170 transmits a buffer request 175 to the local server 160 to begin to buffer the second video 130 from the second remote server 195.

In step 237, the video rendering process 140-2 injects the first video 120 into a live video stream where the first video 120 is injected by the local server 160. In an example embodiment, the mobile application 170 transmits a buffer request 175 to the local server 160 to buffer the second video 130. In response, the local server 160 injects the first video 120 into a live video stream.

In step 238, the video rendering process 140-2 using a video controller 180, renders the first video 120, via the live video stream, on the mobile device 110. In an example embodiment, when the local server 160 injects the first video 120 into the live video stream, the video controller 180 renders the first video 120 via the live video stream. The first video 120 is cached on the local server 160, and is identified by a local address 155 created by the video rendering process 140-2.

In step 239, the video rendering process 140-2, in response to the buffer request 175, transmits a download request 135 to the second remote server 195 to begin to download the second video 130 from the second remote server 195 to the local server 160. In an example embodiment, the mobile application 170 transmits a buffer request 175 to the local server 160 to buffer the second video 130. In response, the local server 160 transmits a download request 135 to the second remote server 195 to begin to download the second video 130 from the second remote server 195 to the local server 160. In other words, the local server 120 begins to buffer the live streaming TV video such that the live streaming TV video (i.e., the second video 130) is buffered when the advertisement video (i.e., the first video 120) has completed.

Figure 12:
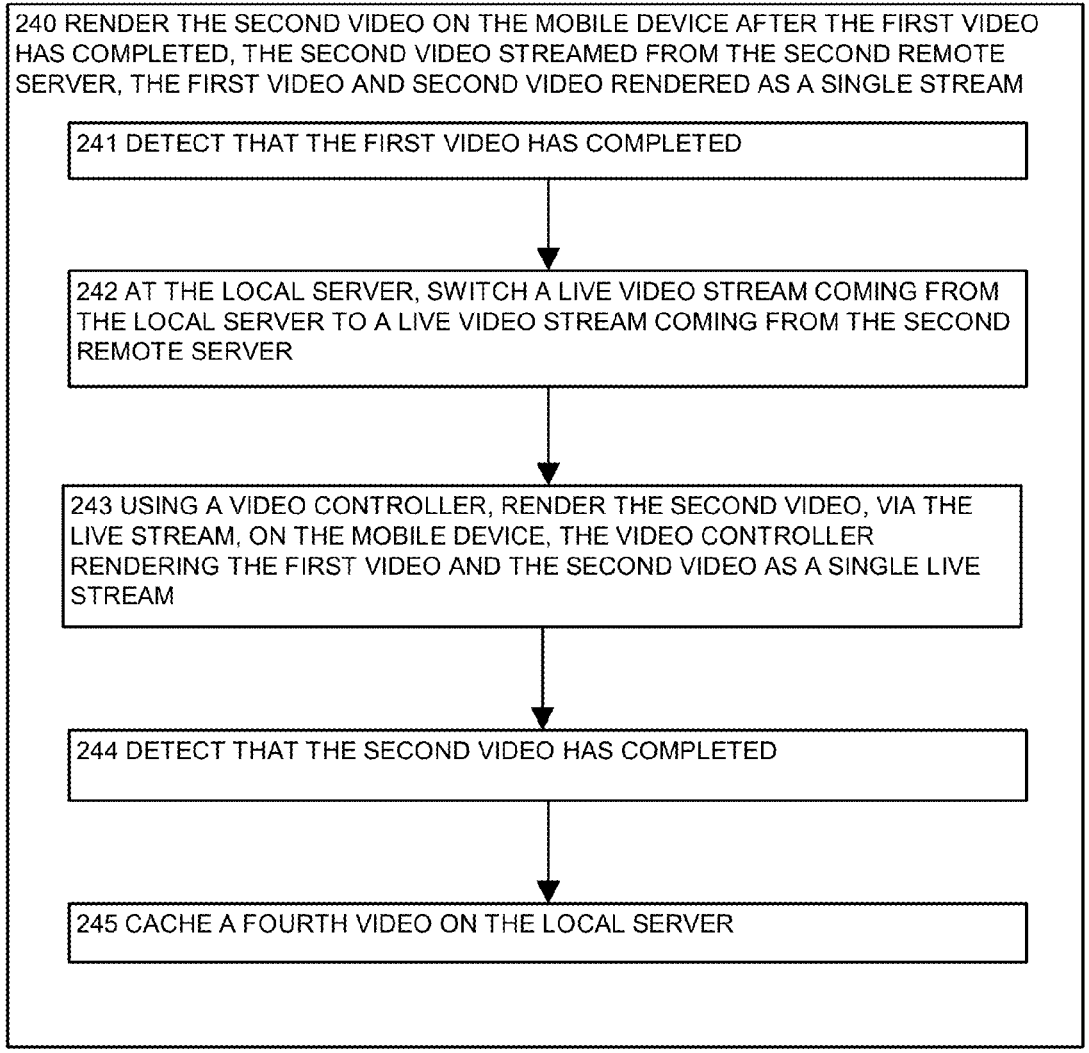
FIG. 12 illustrates a flowchart of a procedure performed by the system of FIG. 1, when the video rendering process renders the second video on the mobile device after the first video has completed, the second video streamed from the second remote server, according to one embodiment disclosed herein.

FIG. 12 is an embodiment of the steps performed by video rendering process 140-2 when it renders the second video 130 on the mobile device 110 after the first video 120 has completed.

In step 240, the video rendering process 140-2 renders the second video 130 on the mobile device 110 after the first video 120 has completed. The second video 130 is streamed from the second remote server 195, and the first video 120 and second video 130 are rendered as a single stream. In an example embodiment, after the first video 120 has completed and the second video 130 is buffered, the video rendering process 140-2 renders the second video 130 on the mobile device 110. From the user's 108 perspective, the transition from the first video 120 (i.e., the advertisement video) to the second video 130 (i.e., the live streaming TV video) occurs without any delay, waiting for the second video 130 to buffer.

In step 241, the video rendering process 140-2 detects that the first video 120 has completed. In an example embodiment, the video controller 180 renders the first video 120, via the live video stream, where is first video 120 resides locally on the local server 160. When the video controller 180 renders the first video 120 in its entirety, the video rendering process 140-2 detects that the first video 120 has completed.

In step 242, the video rendering process 140-2, at the local server 160, switches a live video stream coming from the local server 160 to a live video stream coming from the second remote server 195. In an example embodiment, after the first video 120 is completed and the second video 130 is buffered, the local server 160 switches from streaming the first video 120 from a local file to streaming the second video 130 from the second remote server 195 (i.e., the live TV remote server).

In step 243, the video rendering process 140-2, using a video controller 180, renders the second video 130, via the live stream, on the mobile device 110. The video controller 180 renders the first video 120 and the second video 130 as a single live stream. In other words, the video controller 180 continues to play the live video stream, first rendering the first video 120 (i.e., the advertisement video), and then rendering the second video 130 (i.e., the live streaming TV video).

In step 244, the video rendering process 140-2 detects that the second video 130 has completed. In an example embodiment, the video controller 180 plays the live video stream, first containing the locally cached first video 120, and then playing the second video 130 streaming from the second remote server 195. When the video controller 180 renders the second video 130 in its entirety, the video rendering process 140-2 detects that the second video 130 has completed.

In step 245, the video rendering process 140-2 caches a fourth video on the local server 160. In an example embodiment, the completion of the second video 130 invokes the process of caching the first video 120 on the local server 160. In an example embodiment, when the video rendering process 140-2 detects that the second video 130 (i.e., the live streaming TV video) has completed, the mobile application 170, residing on the mobile device 110, sends a request to the first remote server 190 (i.e., the advertisement server), and in return, receives list of available advertising assets, including advertisement images and advertisement videos (i.e., first videos 120), from the first remote server 190. The video rendering process 140-2 caches the fourth video (i.e., another advertisement video) on the local server 160 for future rendering.

Figure 13:
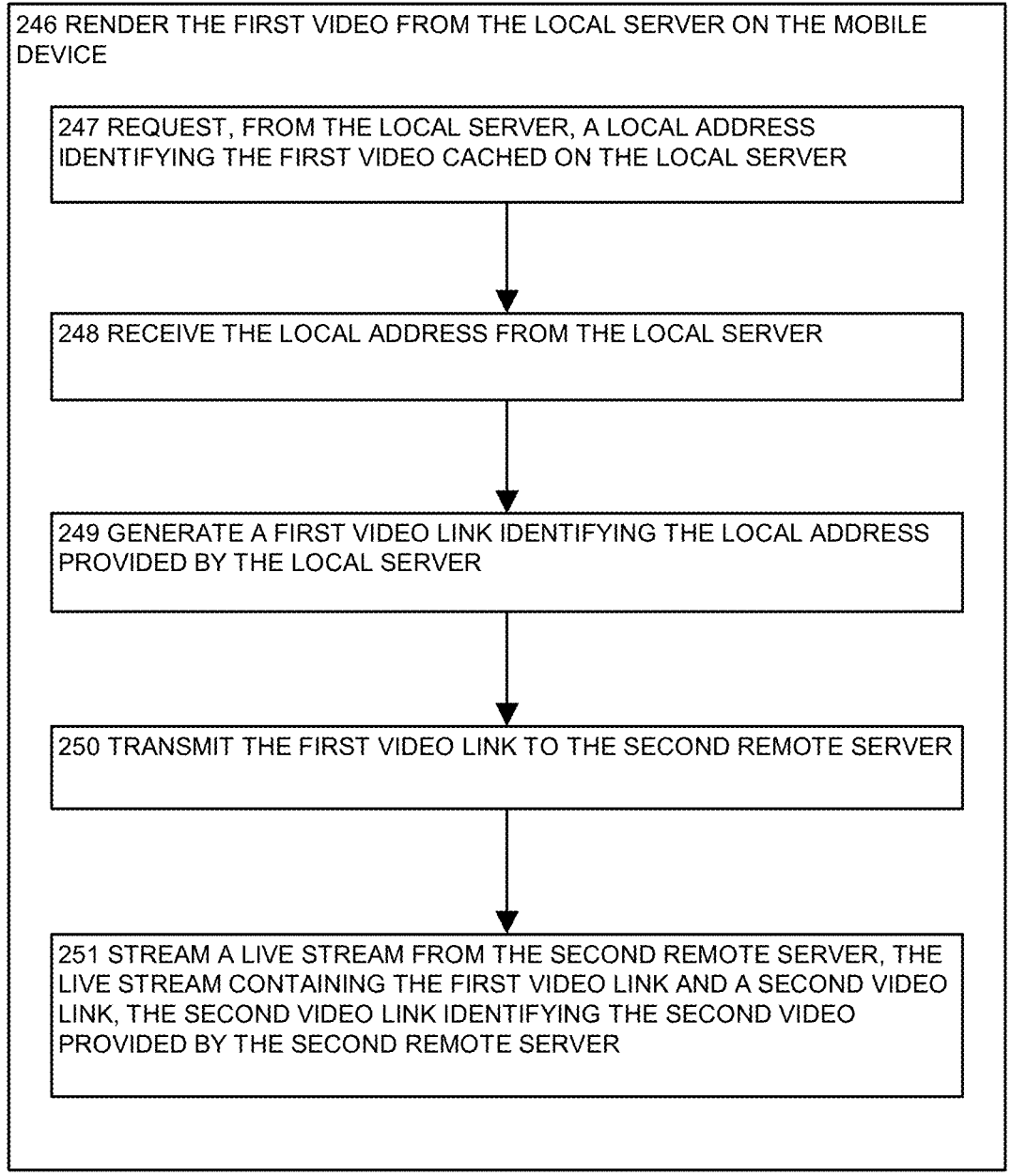
FIG. 13 illustrates a flowchart of a procedure performed by the system of FIG. 1, when the video rendering process renders the first video from the local server on the mobile device, and requests a local address from the local server, according to one embodiment disclosed herein.

FIG. 13 is an embodiment of the steps performed by video rendering process 140-2 when it renders the first video 120 from the local server 160 on the mobile device 110.

In step 246, the video rendering process 140-2 renders the first video 120 from the local server 160 on the mobile device 110. In an example embodiment, a user 108 selects a TV channel to view on their mobile device 110. Prior to rendering the TV channel (i.e., the second video 130), streamed from the second remote server 195 (i.e., the live streaming remote server), the video rendering process 140-2 renders a first video 120 (i.e., an advertisement video), from the local server 160, residing on the mobile device 110. The first video 120 was previously downloaded from a first remote server 190 (i.e., an advertisement server), and cached on the local server 160.

In step 247, the video rendering process 140-2 requests, from the local server 160, a local address 155 identifying the first video 120 cached on the local server 160. In an example embodiment, the video rendering process 140-2 requests that the local server 160 provide a local URL specifying the local address 155 of the first video 120 (i.e., the advertisement video) cached on the local server 160.

In step 248, the video rendering process 140-2 receives the local address 155 from the local server 160. In an example embodiment, in response to the request from the video rendering process 140-2, the local server 160 provides a local URL to the video rendering process 140-2. The local URL specifies the local address 155 of the first video 120 (i.e., the advertisement video) cached on the local server 160.

In step 249, the video rendering process 140-2 generates a first video link identifying the local address 155 (i.e., the local URL) provided by the local server 160. In an example embodiment, the video rendering process 140-2 generates a first video link (i.e., a local URL link) to transmit to the second remote server 195 (i.e., the live streaming TV remote server). The first video link (i.e., the local URL link) points to the local address 155 (i.e., the local URL) provided by the local server 160 to the video rendering process 140-2.

In step 250, the video rendering process 140-2 transmits the first video link to the second remote server 195.

In step 251, the video rendering process 140-2 streams a live stream from the second remote server 195. The live stream contains the first video link (i.e., the local URL link) and also a second video link, where the second video link identifies the second video 130 provided by the second remote server 195. In an example embodiment, the second remote server 195 generates a video stream that includes both the first video link (pointing to the first video 120 stored on the local server 160), and a link to the second video 130 (i.e., the live streaming TV video) provided by the second remote server 195. When the video rendering process 140-2 streams the video stream from the second remote server 195, the video stream includes the first video link (pointing to the first video 120 cached on the local server 160), and the link to the second video 130 (streaming from the second remote server 195).

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A method of rendering a video on a mobile device on which resides a local server, the method comprising:
   determining by the local server when to send a communication from the local server to a first remote server to initiate caching a first video on the local server, wherein said caching further includes:
   receiving by the local server first video information from the first remote server,
   providing another communication from the local server to a first remote server, the another communication requesting the first remote server to download a selected first video, and
   downloading the selected first video to the local server responsive to the provided another communication as well as downloading at least one rule associated with the downloaded first video;

receiving a request to render a second video on the mobile device;

wherein the at least one rule comprises one or more first video displaying rules and wherein said method further comprises examining the one or more first video displaying rules associated with the downloaded first video and the second video being requested to determine if the downloaded first video should be rendered based on the request to render the second video on the mobile device;

wherein in response to such determining that the downloaded first video should be rendered before the second video, then selecting the downloaded first video, rendering the downloaded first video on the mobile device while beginning to buffer the second video from a second remote server, the downloaded first video rendered from the local server, and rendering the second video on the mobile device after the downloaded first video has completed, the second video being streamed from the second remote server, the downloaded first video and second video being rendered as a single stream; and wherein rendering the downloaded first video from the local server on the mobile device includes:
  requesting, from the local server, a local address identifying the downloaded first video cached on the local server,
  receiving the local address from the local server,
  generating a first video link identifying the local address provided by the local server,
  transmitting the first video link to the second remote server, and
  streaming a live stream from the second remote server, the live stream containing the first video link and a second video link, the second video link identifying the second video provided by the second remote server.

2. The method of claim 1 wherein said determining by the local server when to send the communication from the local server to the first remote server to initiate caching includes:
  detecting that a given mobile application, residing on the mobile device, has been launched; and
  in response to such detecting, sending the communication from the local server to the first remote server to initiate caching.

3. The method of claim 1 wherein said determining by the local server when to send the communication from the local server to the first remote server to initiate caching includes:
  downloading, from the first remote server, to the local server at least one first video download schedule, the at least one first video download schedule specifying intervals at which the first video is downloadable from the first remote server, the first video download schedule being utilized by a mobile application, residing on the mobile device, to determine when to send the communication to the first remote server to initiate caching.

4. The method of claim 1 wherein the at least one rule comprises a time limit associated with a respective downloaded first video as to when the respective downloaded first video expires and wherein said method further comprises the step(s) of:
  determining by the local server when the time limit has expired and in response to such determining repeating said initiating caching so as to cache another selected video in place of the expired downloaded first video as a replacement first video to be rendered on the mobile device.

5. The method of claim 1 wherein said caching further includes:
  downloading from the first remote server to the mobile device at least one rule that relates to a given first video;
  determining, from the at least one rule relating to the given first video whether the given first video should be downloaded to the mobile device;
  polling the local server to verify the given first video is cached;
  detecting if the given first video is not cached on the local server; and
  in response to such detecting, instructing the local server to communicate with the first remote server and to repeat said caching so as to cause the given first video to be downloaded to the local server from the first remote server.

6. The method of claim 5 further comprising:
  continuing to interact with a user, via the mobile device, while the first video is downloading from the first remote server to the local server.

7. The method of claim 1 wherein in response to the request to render the second video, rendering the downloaded first video on the mobile device while beginning to buffer the second video from a second remote server, the downloaded first video rendered from the local server comprises:
  selecting the first video to be downloaded based on programmable logic located on the local server, the programmable logic controlled by information transmitted to the local server by the first remote server.

8. The method of claim 1 wherein said selecting the downloaded first video comprises:
  using a priority algorithm to determine which of a plurality of videos cached on the local server should be selected as the downloaded first video to be rendered, the priority algorithm used by a mobile application residing on the mobile device, the priority algorithm used with the at least one rule.

9. The method of claim 1 wherein rendering the downloaded first video from the local server on the mobile device comprises:
  creating the local address identifying the downloaded first video cached on the local server;
  launching a video controller on the mobile device, the video controller capable of rendering the downloaded first video and the second video;
  transmitting the local address to the video controller;
  receiving a live stream request using the local address, the live stream request initiated by the video controller requesting a live video stream from the local server;
  injecting the downloaded first video into the live video stream, the downloaded first video injected by the local server; and
  using the video controller, rendering the downloaded first video, via the live video stream, on the mobile device.

10. The method of claim 9 wherein the steps of creating, launching, and transmitting are performed by a mobile application residing on the mobile device.

11. The method of claim 1 wherein in response to the request to render the second video, rendering the downloaded first video on the mobile device while beginning to buffer the second video from a second remote server, the downloaded first video rendered from the local server comprises:
  while rendering the downloaded first video on the mobile device, transmitting a buffer request to the local server to buffer the second video, the buffer request initiated by a mobile application residing on the mobile device; and in response to the buffer request, transmitting a download request to the second remote server to begin to download the second video from the second remote server to the local server, the download request initiated by the local server.

12. The method of claim 11 wherein while rendering the downloaded first video on the mobile device, transmitting a buffer request to the local server to buffer the second video, the buffer request initiated by a mobile application residing on the mobile device comprises:
   injecting the downloaded first video into a live video stream, the downloaded first video injected by the local server; and
   using a video controller, rendering the downloaded first video, via the live video stream, on the mobile device.

13. The method of claim 1 wherein rendering the second video on the mobile device after rendering of the downloaded first video has completed, the second video streamed from the second remote server, the downloaded first video and second video rendered as a single stream comprises:
   detecting that the downloaded first video has completed;
   at the local server, switching a live video stream coming from the local server to a live video stream coming from the second remote server; and
   using a video controller, rendering the second video, via the live stream, on the mobile device, the video controller rendering the downloaded first video and the second video as a single live stream.

14. The method of claim 13 further comprising:
   detecting that the second video has completed; and
   caching a fourth video on the local server.

15. The method of claim 1 wherein said caching further comprises:
   repeating said steps of receiving, said providing another communication and said downloading the selected video so as to cache a plurality of selected first videos on the local server based on first video advertisement information received from an authorization server.

16. The method of claim 1, wherein said providing another communication includes the local server determining the selected first video that should be downloaded from the first remote server.

17. A computerized mobile device including a local server, comprising:
   a memory;
   a processor;
   a communications interface;
   an interconnection mechanism coupling the memory, the processor and the communications interface;
   wherein the memory is encoded with a video rendering application that is executed on the processor for rendering a video on the computerized mobile device by performing the operations of:
      determining when to send a communication from the local server to a first remote server to initiate caching a first video on the local server, wherein said caching further includes:
      receiving by the local server first video information from the first remote server,
      providing another communication from the local server to a first remote server, the another communication requesting the first remote server to download a selected first video, and
      downloading the selected first video to the local server responsive to the provided another communication as well as downloading at least one rule associated with the downloaded first video;
   receiving a request to render a second video on the computerized mobile device;
   wherein the at least one rule comprises one or more first video displaying rules and wherein the operations further include examining the one or more first video displaying rules associated with the downloaded first video and the second video being requested to determine if the downloaded first video should be rendered based on the request to render the second video on the mobile device;
   wherein in response to such determining that the downloaded first video should be rendered before the second video then selecting the downloaded first video, rendering the downloaded first video on the computerized mobile device while beginning to buffer the second video from a second remote server, the downloaded first video rendered from the local server, and rendering the second video on the computerized mobile device after the downloaded first video has completed, the second video streamed from the second remote server, the downloaded first video and second video rendered as a single stream; and
   wherein rendering the downloaded first video on the computerized mobile device includes performing the operations of:
      requesting, from the local server, a local address identifying the downloaded first video cached on the local server,
      receiving the local address from the local server,
      generating a first video link identifying the local address provided by the local server,
      transmitting the first video link to the second remote server, and
      streaming a live stream from the second remote server, the live stream containing the first video link and a second video link, the second video link identifying the second video provided by the second remote server.

18. A non transitory computer readable medium having computer readable code thereon for execution on a processor to perform the operations of:
   determining when to send a communication from a local server to a first remote server to initiate caching a first video on the local server, the local server residing on a mobile device, wherein said caching further includes:
   receiving by the local server first video information from the first remote server;
   providing another communication from the local server to the first remote server, the another communication requesting the first remote server to download a selected first video, and
   downloading the selected first video to the local server responsive to the provided another communication as well as downloading at least one rule associated with the downloaded first video;
   receiving a request to render a second video on the mobile device;
   wherein the at least one rule comprises one or more first video display rules and the operations further include evaluating the one or more first video displaying rules associated with the downloaded first video and the second video being requested to determine if the first video should be rendered based on the request to render the second video on the mobile device;
   wherein in response to such determining that the downloaded first video should be rendered before the rendering of the second video then the operations further include selecting the downloaded first video, rendering the downloaded first video on the mobile device while beginning to buffer the second video from a second remote server, the downloaded first video rendered from the local server and selected based on the second video, and rendering the second video on the mobile device after the downloaded first video has completed, the second video streamed from the second remote server, the downloaded first video and second video rendered as a single stream; and wherein said rendering the downloaded first video on the mobile device, further includes:

requesting, from the local server, a local address identifying the downloaded first video cached on the local server, receiving the local address from the local server, generating a first video link identifying the local address provided by the local server, transmitting the first video link to the second remote server, and streaming a live stream from the second remote server, the live stream containing the first video link and a second video link, the second video link identifying the second video provided by the second remote server.

\* \* \* \* \*